Figure 1:
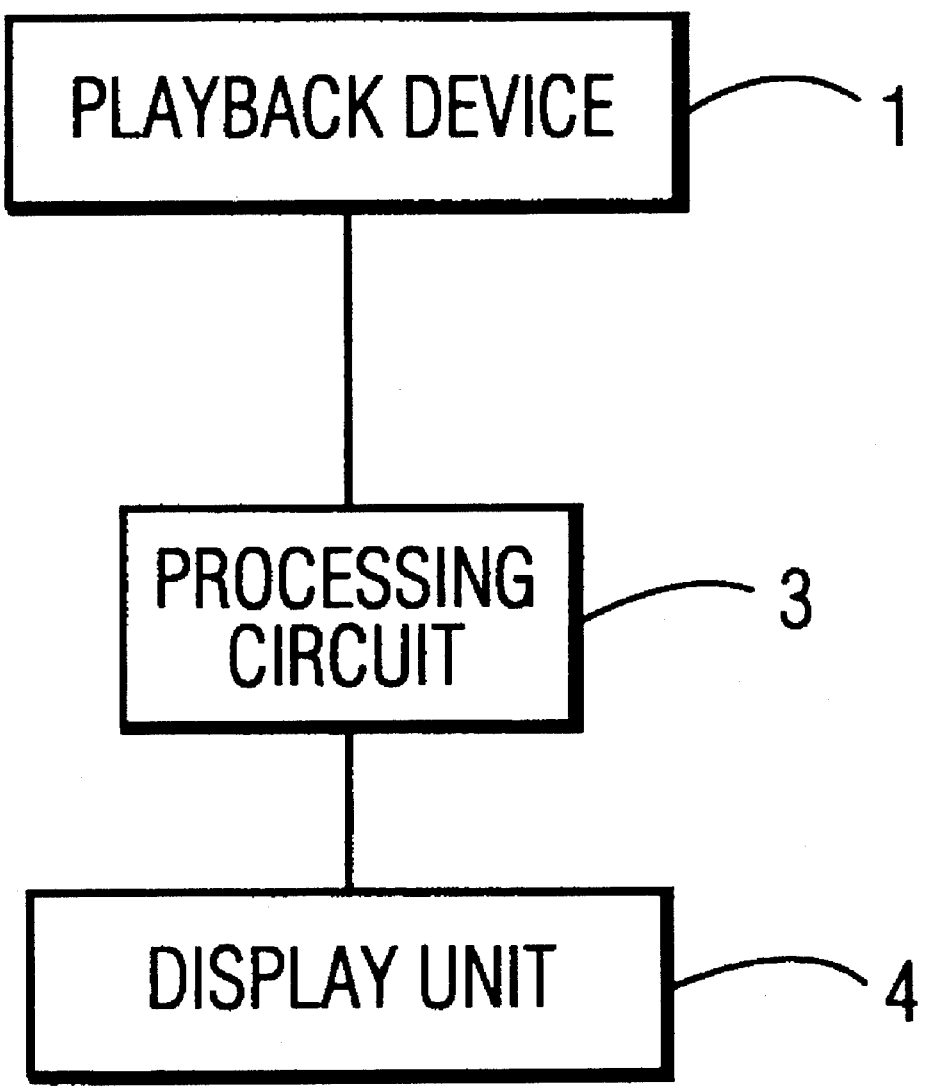

United States Patent [19]

Kühn et al.

[11] Patent Number: 5,485,444
[45] Date of Patent: Jan. 16, 1996

[54] SIGNALIZATION OF TYPES OF DEFECTS OF AN OPTICAL INFORMATION CARRIER

[75] Inventors: Hans-Robert Kühn; Engelbert Läufer, both of St. Georgen; Richard Rutschmann, Wutöschingen, all of Germany

[73] Assignee: Deustsche Thomson-Brandt GmbH, Villingen-Schwenningen, Germany

[21] Appl. No.: 442,555

[22] Filed: May 16, 1995

Related U.S. Application Data

[63] Continuation of Ser. No. 163,237, filed as PCT/EP92/01191, May 28, 1992, abandoned.

[30] Foreign Application Priority Data

Jun. 7, 1991 [DE] Germany ............................ 41 18 672.9
Jun. 25, 1991 [DE] Germany ............................ 41 20 870.6
Mar. 28, 1992 [DE] Germany ............................ 42 10 264.2

[51] Int. Cl.⁶ ...................................................... G11B 7/00
[52] U.S. Cl. .................................. 369/54; 369/58; 369/32
[58] Field of Search ................................ 369/54, 32, 48, 369/58, 32, 44.32, 44.26, 124; 307/296.6, 254, 362; 328/127

[56] References Cited

U.S. PATENT DOCUMENTS

| | | | |
|---|---|---|---|
| 4,287,587 | 10/1981 | Simshauser et al. | 369/50 |
| 5,210,735 | 5/1993 | Hoshino et al. | 369/54 |
| 5,212,677 | 5/1993 | Shimot et al. | 369/58 |
| 5,270,880 | 12/1993 | Ottesen et al. | 369/54 |
| 5,303,219 | 4/1994 | Kulakowski et al. | 369/54 |

FOREIGN PATENT DOCUMENTS

| | | |
|---|---|---|
| 0073519 | 3/1983 | European Pat. Off. |
| 0144831 | 11/1984 | European Pat. Off. |
| 0302507 | 2/1989 | European Pat. Off. |
| 2851822 | 6/1980 | Germany . |
| 4029220 | 3/1992 | Germany . |
| 2137799 | 3/1984 | United Kingdom . |

OTHER PUBLICATIONS

Elektor Electronics, vol. 15, No. 171 Oct 1989, Canterbury pp. 12–15 Giffard "CD Error Detector".

IBM Technical Journal, vol. 31 No. 8, Jan. 1989, New York pp. 128–130 "Multi–Threshold Surface Ananysis Tester".

*Primary Examiner*—Nabil Z. Hindi
*Attorney, Agent, or Firm*—Joseph S. Tripoli; Eric P. Herrmann

[57] ABSTRACT

A process and an arrangement for identifying the type of defects in optical information from an optical information carrier includes circuitry for detecting the displaying various types of defects which can occur in the information carrier. A processing circuit is linked to a display device to enable the cause of the defect to be displayed. The invention facilitates evaluation of the fidelity of reproduction of optical information carriers,

15 Claims, 6 Drawing Sheets

SIGNALIZATION OF TYPES OF DEFECTS OF AN OPTICAL INFORMATION CARRIER

This is a continuation of application Ser. No. 08/163,237 filed 06 Dec. 1993 by Hans-Robert Kuhn, Engelbert Laufer and Richard Rutschmann, which is a national application of PCT application PCT/EP 92/01191 filed 28 May 1992.

The invention concerns a method and an arrangement for type of error signalling for optical information media with a playback device in the sense of "fuzzy logic" which not only signals (indicates) the presence of an error but also the type of error like, for example, fingerprints on a compact disk, thereby enabling the user to regenerate, if necessary, the original playback quality of the optical information medium. The field to which the invention belongs concerns the signalling of at least one type of error for optical information media such as appear upon negligent handling of a compact disk (CD), laser disk or similar information media, whereby the playback device usually provided for reproducing the information is utilized.

Despite taking great care, optical information media used for recording and playback of audio and/or video signals or data signals exhibit both manufacturing faults and defects caused by the environment which can be corrected or, respectively, interpolated to a certain extent by the playback devices by means of an error correction facility. Without this capability the compact disk or laser disk could not be realized because then none of the many bits would be able to be lost or, respectively, none of the innumerable pits on the disk would be allowed to become dirty or covered. However, errors on the optical information medium can at least affect the originality of the reproduction or lead to interruptions upon playback. Both coincidential (accidental) isolated errors, such as little air bubbles or impurities in the protective coating of the optical information medium, and so-called regional errors, i.e. scratches and fingerprints, appear and these can destroy or cover up much information so that the user can no longer decide whether original or calculated, rather interpolated, information is being reproduced.

In order to indicate the technical quality of a CD presently being played there is an error indicating device known which shows the workload of the error correction, cf. KRIEG, Bernhard: "Praxis der digitalen Audiotechnik: digital Aufnahme und Wiedergabe" (The practice of digital audio technology: digital recording and playback), Franzis-Verlag GmbH, Munich 1989, pp. 60 through 63. The workload of the error correction is a mirror image of the error rate of the optical information medium signalized by the program counter present in the playback device. The error rate represents both the frequency of occurence and number of errors. Although it is a direct index for the technical quality of a presently played CD, the user receives no information about measures which might be necessary in order to reduce the error rate because it is only the frequency and number of errors which are signalled and not the type of error, however.

Consequently, type of error signalling demands a system which is more complex than the error rate system. It is generally known that such systems which assist humans to make decisions about weighted, complex problems are designated as "fuzzy logic".

It is also known that laser scanners for the optical inspection of information media are used during the manufacture of CDs, and that such scanners are expensive and are used within the framework of quality assurance to enable a pass/fail grading of CDs, cf. "Wenn es klickt, nicht gleich den Spieler schelten" (If it clicks, don't just blame the player), Frankfurter Allgemeine Zeitung, Jan. 7, 1992. The error rate, representing the number of disturbing events on the disk, also serves as a checking criterion. However, the consumer cannot be expected to invest in such a costly system for signalling errors on optical information media in the form of a supplementary device. It ought to be mentioned that these facilities cannot distinguish between different types of errors.

Furthermore, a method is known for error detection in the case of signals which are stored in spiral tracks on rotating information media in the form of discs, in the case of which method an error signal is identified by comparison with the signal content of preceding revolutions in such a manner that, if the error signal signal is repeated in the next subsequent revolutions a scratch is recorded and, if it is not repeated, an individual error is recorded, c.f. DE-OS 2,851, 822. A shift register whose length is equal to one revolution is provided in order to carry out the method. Spatially limited errors are found electronically in any specific manner and are passed to the input of the device as a pulse signal. The method is based on the fact that an error signal is compared with the signal content of preceding revolutions. A repetition of the error signal at the same location in the radial direction in the next revolution is recorded using a shift register. Thus, only errors and error signals which occur on a straight line running radially on the recording media lead to a scratch being signaled. However, the fact that scratches or pits have a course which, as a rule, does not correspond with a straight line running radially is not taken into account. The electronic error signal is written in a shift register whose length is exactly equal to one revolution so that only locations located on a straight radial line are detected.

A pulse transmitter, which is not normal for playback devices of rotating information media in the form of discs and is fitted rigidly to the drive shaft of the information medium, is used for location determination.

It is therefore the object of the invention to create a method and an arrangement which renders possible, at little expenditure, the signalling of at least one type of error, such as fingerprints, for example, of an optical information medium with a playback device so that the user may assess more easily the quality o the optical recording medium by means of the advice or rather signalling system, and is given advice as to how to achieve a better reproduction quality when the cause of the error is that fingerprints are present.

The task posed is solved according to the invention in that at least one cause of error, or rather type of error, is determined in a first procedure step and is signalled or, respectively, indicated in a second procedure step.

Provided that the optical information medium just played exhibits a defect, at least one cause of error will be explicitly indicated so that the user, in the case of the error being caused by a fingerprint, may restore the original reproduction quality by simply wiping the fingerprints away, preferably in a straight line from the center to the edge.

The starting point for the method is the optical information medium which exhibits an increasing number of faults particularly through multiple and negligent handling and is optically scanned using a playback device employed in the conventional way for the reproduction of the information.

Owing to the local characteristics exhibited by the causes of the errors, when determining the cause of error from the error rate, a number of defective frames, no longer corrected by the decoder, representing the degree of error of an optical disk is set in relation to the location of the errors, whereby the location of the errors can be determined from the number of subcode blocks between error bursts (packets) evaluated corresponding to the error rate. The cause of error is, therefore, determined using an error rate which appears in the neighboring tracks of a disk sector.

The reparable cause of error, fingerprint, is preferably indicated when more than three error bursts appear in five neighboring tracks. On the other hand, scratches and so-called black dots are preferably identified, or rather recognized as the cause of an error, and signalled when there appear up to three error bursts in three neighboring tracks.

On the other hand, the high frequency signal detected from the optical information medium using the playback device can be used to determine at least one cause of error. For this, a measuring (test) signal is derived from the high frequency signal and the appearance of said measuring signal within an upper and lower threshold value is established over a time period characterizing the cause of error. Preferably, 10 percent and 90 percent of the high frequency signal are used as threshold values for determining the cause of error, whereby the threshold values are related to the upper and lower peak values of the high frequency signal in order to compensate for, in particular, tolerances of the scanners and the reflection characteristics of differing optical information media. In order that the measuring signal can be evaluated with respect to the threshold values which are also derived from the high frequency signal, threshold values are used which have a considerably greater time constant in comparison to the measuring signal.

In order to play back the optical information medium at higher speed, for example, when transferring the optical disk onto a tape using so-called high-speed dubbing or for searching for causes of error using considerably shortened playback time, it is advantageous to use threshold values with a lower time constant because impairments otherwise will only be established upon playing back at normal playback speed.

The time range characterizing fingerprint as cause of error is preferably a duration of 4 ms or longer in which the measuring signal, derived from the high frequency signal, appears within the threshold values. By altering the threshold values, the time constants of the threshold values and the time range, not only fingerprints as a cause of error but also other causes of error can be determined. Furthermore, it is possible to determine different causes of errors and carry out a weighting of the degree of the cause(s) of error(s) with both the solution based on the error degree and that based on the high frequency signal by varying the parameters and, if necessary, combining the solutions. The user is, for example, informed whether the disturbed playback is caused by light fingerprints, heavy fingerprints or a cause of error made audible by fingerprints or another cause of error.

In order to increase the rate of success with identifying fingerprints with respect to other disturbances, the signal representing the fault is preferably coupled with a signal equivalent to the disk rotation. Thereby, it is avoided that several brief disturbances, not caused by fingerprints, add up to a signal corresponding to the fingerprint signal. The signal equivalent to the disk rotation is preferably the output signal of the so-called radial detector. Furthermore, it is advantageous not to interrupt the process of adding up a defined number of track completions for detecting the radial extent of fingerprints as soon as, within the process of counting, an individual track rotation is free from disturbing signals.

The indication of a cause of error or several causes of error is carried out visually and/or acoustically. In order to guarantee that the operator notices the error indication, the cause of error is also signalled longer than the duration of its appearance.

In order to carry out the method an arrangement is provided which consists of a processing circuit for processing signals of the layback device representing errors on an optical information medium and feeding of a display unit for at least one cause of error.

A processing circuit which serves for processing the signals representing the error degree of an optical information medium is preferably connected to the decoder or, respectively, program error counter of the playback device and formed by a computing unit setting defective frames in relation to the location of the errors.

A processing circuit which serves for processing the high frequency signals detected from the optical disk by the playback device is preferably connected to the scanner of the playback device and consists of a threshold circuit, which makes available an upper threshold value and a lower threshold value for the high frequency signal and in which a measuring signal derived from the high frequency signal is detected within the threshold values, and a time function element with which the duration, or rather, the duration of stay of the measuring signal within the threshold values is established.

The threshold circuit preferably consists of two first peak value rectifiers pointing in opposing directions which are connected to each other via a voltage divider in turn connected to two comparators which are connected, on the input side, to a second peak value rectifier supplying the measuring signal and to the input of a gate on the output side.

The peak value rectifiers each consist of one diode, one capacitor and one constant current source or at least one resistor in conjunction with one diode and one capacitor. In this case the first peak value rectifiers have a considerably larger time constant in comparison to the second peak value rectifier in order to make available threshold values for the measuring signal derived from the high frequency signal. The time constant of the first peak value rectifiers is preferably 200 ms while the time constant of the second peak value rectifier has a value in the region of 2 ms. Preferably, 10 percent and 90 percent of the high frequency signal are used as threshold values, formed using the voltage divider joining the peak value rectifiers, and fed as comparative value to comparators. The measuring signal derived from the high frequency signal is also fed to these comparators so that, owing to the differing time constants, an appearance of the measuring signal within the threshold values is determined and then signalled via a gate by means of the coupling of the outputs of the comparators.

As fingerprints, in contrast to the so-called black dots, are not reflected in the high frequency signal as complete breakdowns in the voltage of the high frequency signal, a distinction between these causes of error is, therefore, already possible.

However, as an optical information medium can also have scratches which are reflected in the high frequency signal as a measuring signal within the threshold values in a similar way to fingerprint errors, a more extensive evaluation of the measuring signal is necessary. To do this, a time function element is provided connected to the gate and said element is used to establish and evaluate the duration of the appearance of the measuring signal within the threshold values. As the local extent of fingerprints is larger than that of scratches, the duration of the attenuation of or breakdowns in the high frequency signal, or rather measuring signal, is used as an additional criterion for distinguishing causes of errors. An appropriate circuit or an integrator with downstream comparator is suitable as a time function element, whereby the output of this, upon the appearance of the measuring signal within the threshold values, preferably makes an output signal available after a duration of 4 ms and said output signal is used to determine fingerprints as a cause of error.

In order to ensure that, as a result of the mostly brief duration of the appearance of errors, the error display is also noticed by the operator of the playback device, a monoflop and/or a memory which may be reset are connected downstream from the comparator. Thereby, a display which lasts longer than the duration of the appearance of the cause of error is achieved. Furthermore, this type of display is advantageous when used in conjunction with so-called changers or magazine playback devices because the information about a defective optical disk is displayed, if necessary, until the loading of a new magazine, upon which the resetting of the memory is then performed.

It is also provided that the peak value rectifiers be constructed so that they may be switched over to other time constants in order to also guarantee the effectiveness of the cause of error display when playing back at higher speeds, for example, as is necessary when copying with so-called high-speed dubbing. Because, as a rule, this type of copying will not be listened to, errors could otherwise perhaps then only be first noticed when playing back at normal speed. Such a time constant switchover is also necessary for a so-called search procedure in which the optical disk is examined with considerably shorter playback time with respect to the appearance of errors.

By altering the parameters of the arrangement, other causes of errors can also be determined than the fingerprint cause of error and an adaption to the information medium can be carried out. Furthermore, the arrangement is suitable for performing an evaluation of a cause of error with respect to its intensity.

A visually and/or acoustically signalling display unit is provided independent of the construction of the processing circuit with which at least one cause of error is determined and said display unit consists of one or more light-emitting diodes, a display screen or indicator field, or a calling tone unit which generates one or more audio signals. By using the display unit, preferably reparable causes of errors or also reparable and/or irreparable causes of error are indicated.

With regard to the design of the device, the display unit and the processing circuit are combined into one error indicating device which is connected as a separate error indicating device to the playback device, or the error indicating device is integrated into the playback device and forms one componental unit with this.

The advantages of the method and the arrangement are, in particular, that the assessment of the reproduction quality of an optical information medium is made easier for the operator of the playback device, and that in order to do this facilities present in the playback device and procedure steps already realized can be utilized, and the user receives explicit information about, if applicable, existing causes of errors on the optical information medium just played back which enables the user, in the case of fingerprints, to restore the orignal reproduction quality of the optical information medium by simply wiping such marks away.

The method and the arrangement can be realized with little expenditure and the user receives information about whether original data or data essentially calculated or rather interpolated using a correction system is being played back.

In the following, the invention is more closely explained by means of drawings representing two embodiment solutions.

Figure 2:
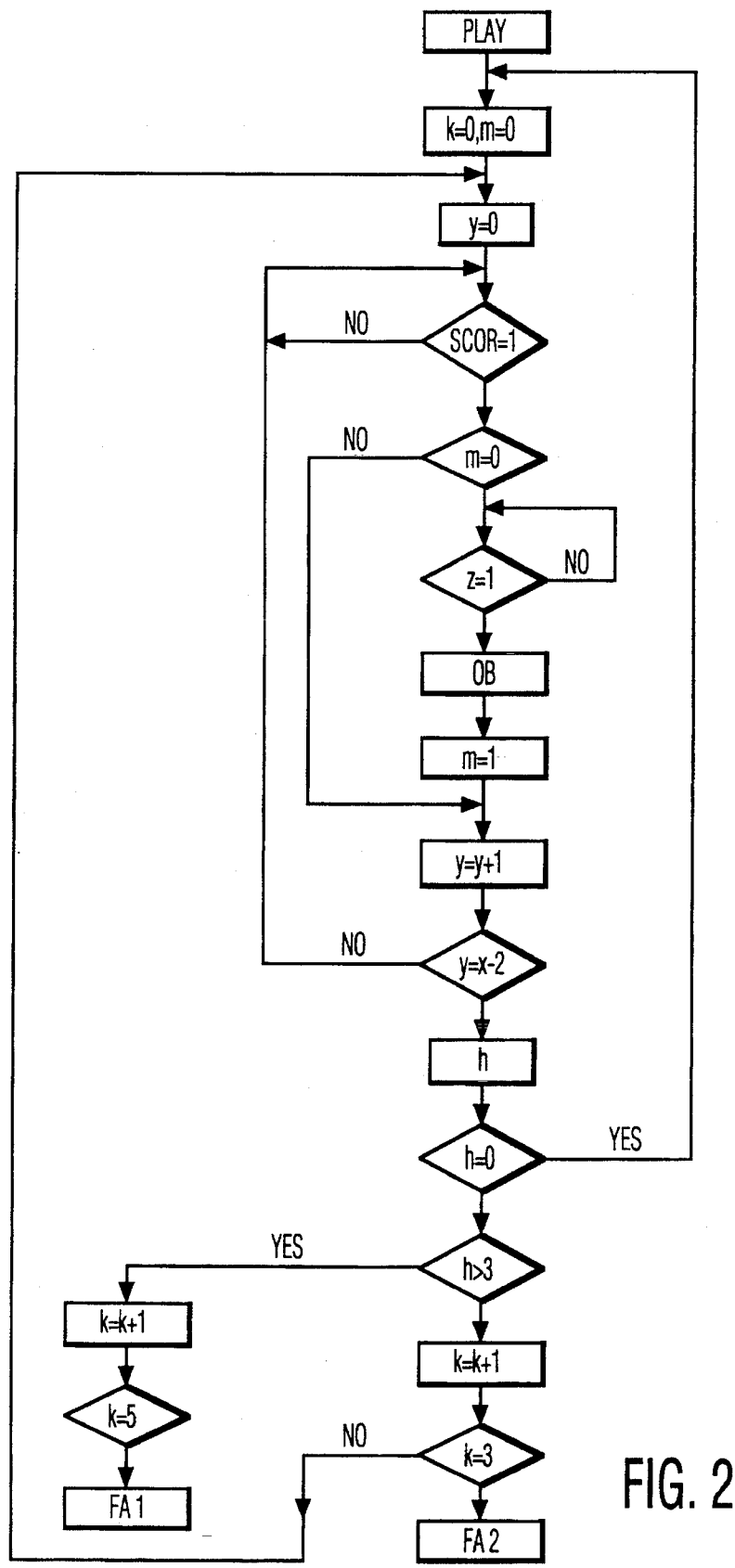
Figure 3:
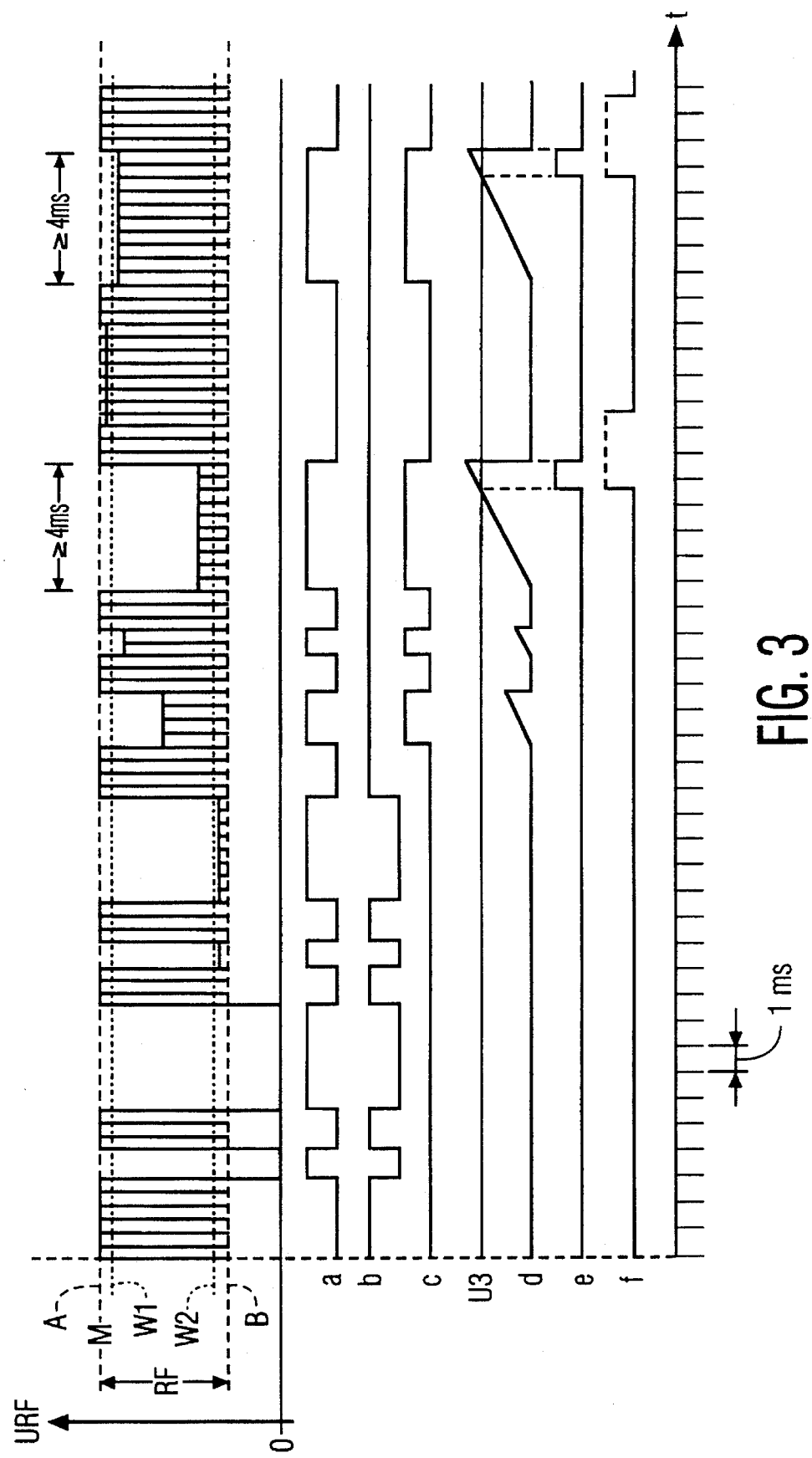
Figure 4:
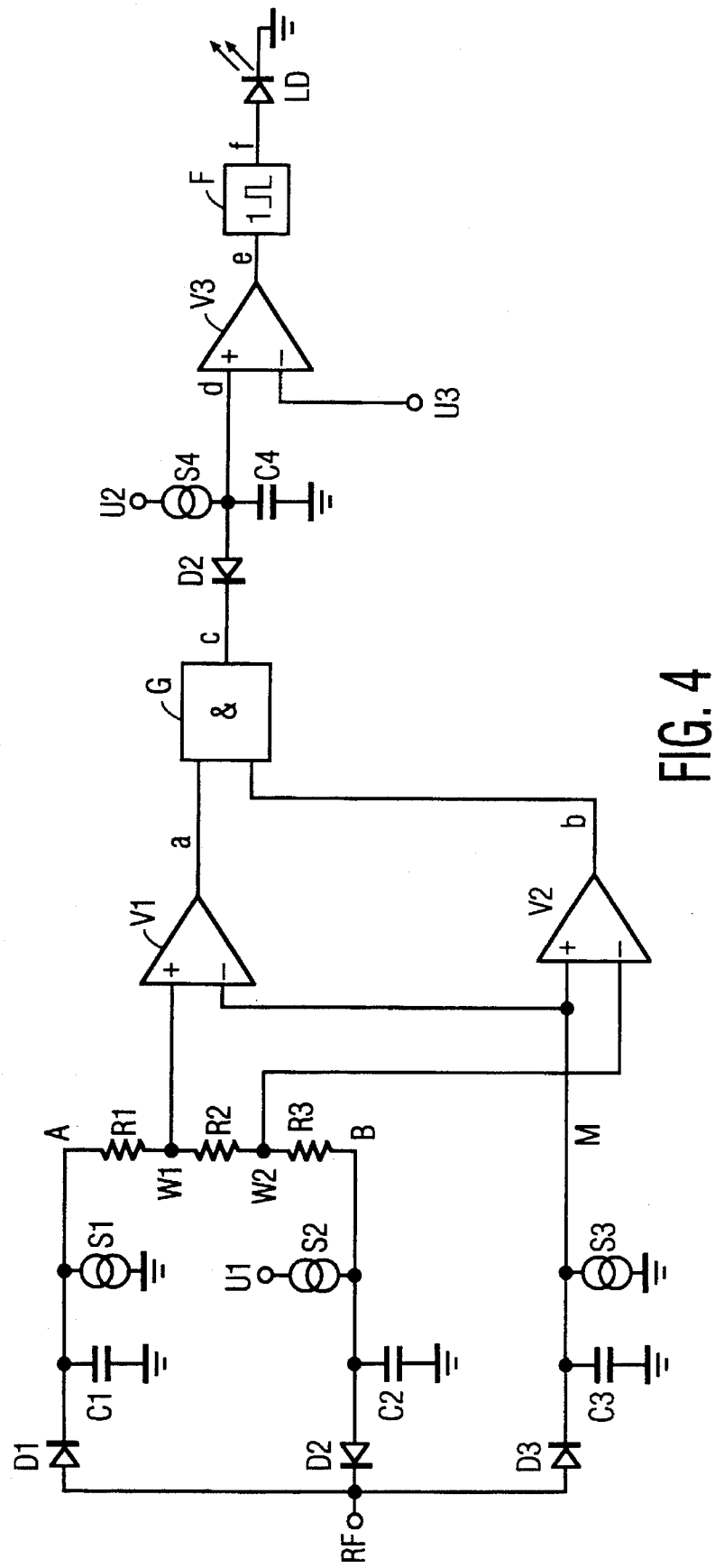
Figure 5:
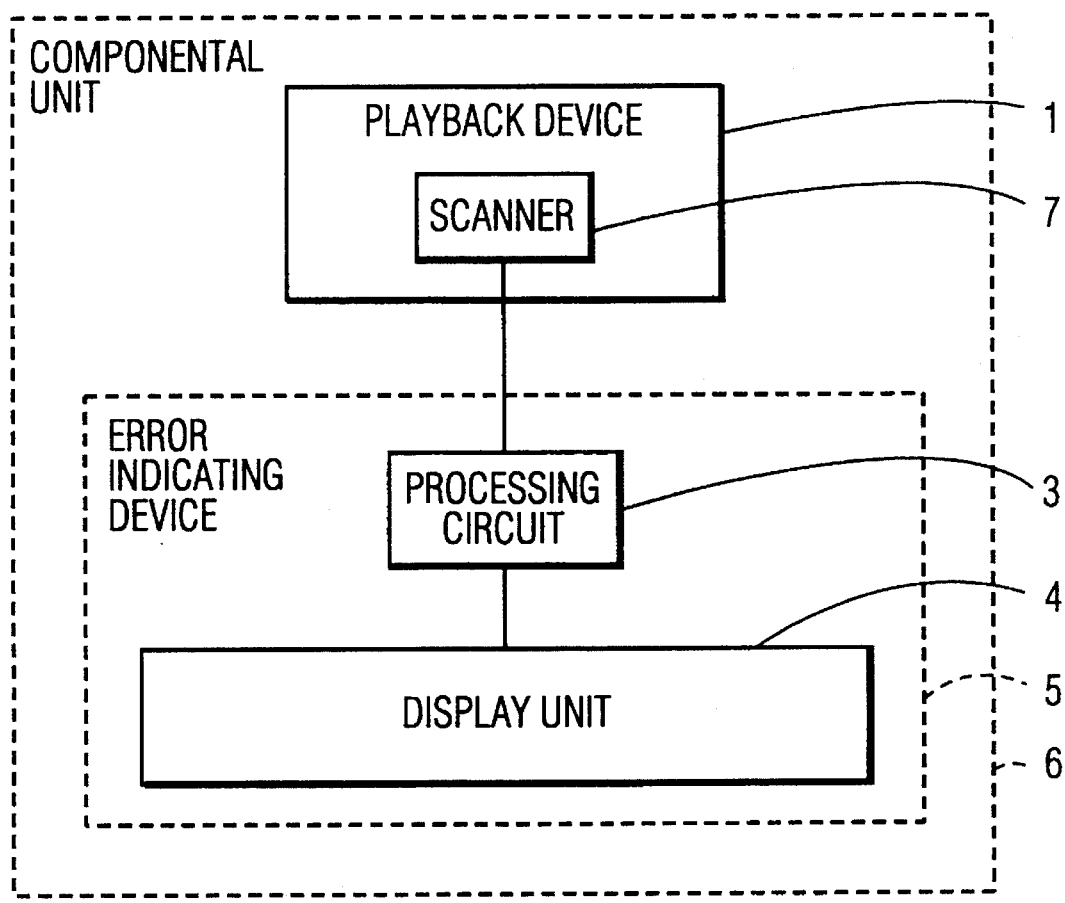
Figure 6:
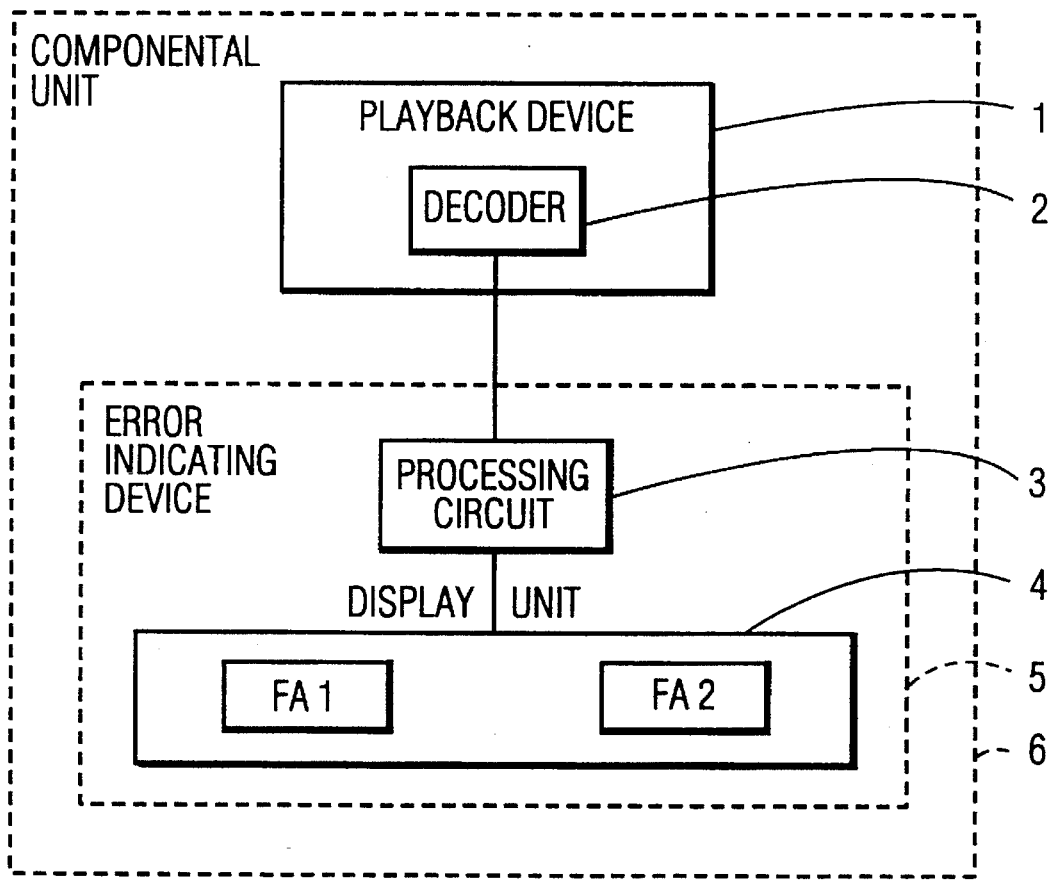

FIG. 1 shows a block circuit diagram for executing the method for type of error signalling for optical information media with a playback device 1, FIG. 2 shows a flow chart for the method of type of error indication based on degree of error, FIG. 3 shows signal progressions, represented schematically, for the method and arrangement for signalling the cause of error based on the high frequency signal RF of playback device 1, FIG. 4 shows an arrangement for the type of error indication based on the high frequency signal RF, FIG. 5 shows a block circuit diagram of an arrangement for the type of error indication based on the high frequency signal RF, FIG. 6 shows a block circuit diagram of an arrangement for the type of error indication based on the error degree.

According to FIG. 1, the method for signalling the type of error on optical information media is carried out using a playback device 1, in which at least one cause of error is determined in a first procedure step and indicated in a second procedure step, a processing circuit 3 and a display unit 4.

In a first embodiment solution to the signalling of type of error on a compact disk, the first procedure step consists of at least one cause of error being determined from the degree of error which is made available by a decoder 2 which is not illustrated in the playback device 1. For determining the causes of errors from the error degree of an optical recording medium, according to FIG. 2, firstly, upon starting the playback device PLAY, the number of tracks k to be examined regarding the appearance of errors as well as a flag m representing an error rate z are set to zero. The number of subcode blocks y is also set equal to zero upon starting the playback device PLAY. When the first subcode synchronizing signal SCOR appears the signal flow progression is continued. The flag m representing the error rate z is set when an interpolation appears for the first time, the presence of which is derived, similarly to the error rate z, from the facilities of the playback device signalling the error rate of the optical disk. If an error rate $z=1$ appears then, by calculating the number of subcode blocks y per revolution x, a position finding OB is performed. The number of subcode blocks y per revolution x results from the scanning diameter calculated from the so-called subcode ATIME multiplied by the number 11, divided by the product of subcode block time and scanning speed. The scanning speed only has to be determined in a known manner once for each disk and the number of subcode blocks y per revolution x is preferably rounded down to a whole number. Furthermore, the flag m representing the error rate z is set equal to one, and subsequently, through increasing the number of subcode blocks y by one it is waited to see whether or not an error rate z appears again in the same disk sector. Apart from that, the inaccuracy of two subcode blocks y is taken into account in a following step. An evaluation of defective frames in error burst h follows this. According to experimental results, a size of error burst h relating to a subcode block time corresponding to four frames within a 96 frame was selected in order to enable, in combination with a number of tracks k to be examined regarding the appearance of errors, a distinction between errors caused by fingerprints, scratches and black dots. It has become apparent that the reparable cause of error fingerprint is present as a first type of error FA1 when more than three error bursts h appear in five neighboring tracks k. On the other hand, scratches and black dots as second type of error FA2 are identified by the appearance of up to three error bursts h in three neighboring tracks k.

In order to increase the rate of success with identifying fingerprints with respect to other disturbances, the signal representing the fault is coupled with a signal equivalent to the disk rotation. Thereby, it is avoided that several brief disturbances, not caused by fingerprints, add up to a signal corresponding to the fingerprint signal. The output signal of the so-called radial detector is preferably used as a signal equivalent to the disk rotation. On the other hand, it is advantageous not to interrupt the process of adding up a defined number of track completions corresponding to the disk rotations for detecting the radial extent of fingerprints as soon as, within the process of counting, an individual track rotation is free from disturbing signals.

An arrangement corresponding to this embodiment solution is illustrated in FIG. 6. It consists of a playback device 1 which contains a decoder 2 signalling the error degree of the optical disk, a processing circuit 3 and a display unit 4. The processing circuit 3, used to process the signals representing the error degree of the optical disk just played, is connected to the decoder 2. The processing circuit is a computational unit with which the defective frame is set in relation to the location of an error. When the calculation is finished one of the causes of error—fingerprint, scratch or black dot—is determined if present and an according signal is conveyed to the display unit 4 connected to the process circuit 3, and said display unit signals the corresponding cause of error, by means of an display, as a first type of error FA1 or a second type of error FA2.

In a second embodiment solution the first procedure step consists of that at least the fingerprint cause of error is determined from the high frequency signal RF detected from the optical disk by the playback device 1. In order to explain the method a high frequency signal RF, in which the main causes of error are specified, is illustrated schematically in FIG. 3. It has been discovered that when the black dot error is present, the voltage URF of the high frequency signal RF exhibits considerable breakdowns which range from zero to approximately 10 percent of the high frequency signal RF. These breakdowns can, as shown in the signal progression, have differing depths of breakdown and lengths of breakdown.

Scratches as a cause of error lead to breakdowns in the voltage URF of the high frequency signal RF, characterized by a lower depth of breakdown and predominantly also by a shorter length of breakdown.

Owing to their extent on the optical disk, fingerprints lead to breakdowns in the voltage URF of the high frequency signal RF with a breakdown length, or rather duration, of 4 ms or more. In this case the strength of the fingerprint corresponds to the depth of breakdown. As very light fingerprints do not influence the playback quality of the optical disk, they may remain unconsidered. Based on these findings obtained, a measuring signal M is derived from the high frequency signal RF and when the measuring signal M appears within an upper threshold value W1, defined as 90 percent of the high frequency signal RF, and a lower threshold value W2, corresponding to 10 percent of the high frequency signal RF, in a time range with a duration of 4 ms or longer the fingerprint cause of error is determined.

Independence of the absolute voltage URF of the high frequency signal RF is achieved through the relating the threshold values W1, W2 to peak values A, B of the high frequency signal RF, and said independence is specific to the device and dependent on the quality of relective coating on the optical disk. In order to be able to evaluate measuring signal M with reference to the threshold values W1, W2 also derived from the high frequency signal RF, their time constants were selected considerably larger in comparison to the time constant of measuring signal M. The time constants of threshold values W1, W2 are 200 ms and that of the measuring signal is 2 ms.

Independently from the embodiment solution of the first procedure step, the aforementioned display unit 4 then signals at least one cause of error in a second procedure step.

In order to realize the embodiment solution based on the high frequency signal RF, an arrangement corresponding to FIG. 4 is provided, the block circuit diagram for which is illustrated in FIG. 5. This block circuit diagram has a processing circuit 3, similar to the block circuit diagram specified in FIG. 6 for the error indication based on the error degree, with a display unit 4 connected to it restricted, in this case, to the fingerprint cause of error. The processing circuit 3 is also connected to the playback device 1 and, in this embodiment solution, connected to the scanner 7 of playback device 1 which detects the high frequency signal RF from the optical disk. Together with the display unit 4 it forms the error indicating device 5, the internal construction of which is illustrated in the arrangement corresponding to FIG. 4. This consists of three peak value rectifiers D1, C1, S1; D2, C2, S2; D3, C3, S3 each of which contains a diode D1, D2, D3, a capacitor C1, C2, C3 and a constant current source S1, S2, S3.

The constant current sources S1, S2, S3 are, in the direction of the diodes D1, D2, D3, connected to a grounded conductor or a supply voltage U1, and the capacitors C1. C2, C3 are connected to the grounded conductor.

The diodes D1, D2 of the two first peak value rectifiers D1, C1, S1; D2, C2, S2 are poled in opposite directions and, a third diode D3 of the third peak value rectifier D3, C3, S3, are connected to the scanner 7 which provides the high frequency signal RF. The polarity of diode D3 of the third peak value rectifier D3, C3, S3, from which the measuring signal M is derived from the high frequency signal RF, corresponds to the phase position of the high frequency signal RF. Two first comparators V1, V2 have respective first input terminals connected to the third peak value rectifier D3, C3, S3. Respective second inputs of these comparators are connected to a voltage divider formed by resistors R1, R2, R3 connected between the peak value rectifiers D1, C1, S1, and D2, C2, S3. The voltage divider makes available threshold values W1, W2 related to upper and lower peak values A, B of the high frequency signal RF, and which are 10 percent and 90 percent respectively of the high frequency signal RF. The two comparators V1, V2 determine when the measuring signal M rises above or drops below the threshold values W1, W2. The output signals 'a', 'b' provided by the two comparators V1, V2 for the measuring signal M corresponding to the causes of error, and are illustrated in FIG. 3. A signal 'c' is made available by logically coupling the output signals 'a', 'b' of the two first comparators V1, V2 via an AND gate G, and exhibits a predetermined state, when the measuring signal M is within the threshold values W1, W2.

As a time evaluation of the output signal M has to be carried out in addition, a time function element, formed by an integrator with downstream comparator V3, is connected to the output of gate G. The integrator consists of a diode D4, a constant current source S4, connected to a supply voltage U2, and a capacitor C4. An integrating signal 'd' corresponding to the signal 'c' of gate G, also illustrated in FIG. 3, is made available and fed to the comparator V3 for comparison with reference voltage U3 so that the error signal, characterizing the fingerprint cause of error, is provided at the output of the comparator V3 through the duration of 4 ms defined by the reference voltage U3.

In order to ensure that the relatively briefly appearing error signal 'e' is noticed by the operator of the playback device 1, a monoflop F for pulse stretching is connected to comparator V3, the indicator signal 'f' of said monoflop also being illustrated in FIG. 3, and is fed to a light-emitting diode LD which indicates visually the cause of error 'fingerprint'. This error indicating device 5 based on the high frequency signal RF can, similarly to an error indicating device 5 based on the error degree which also consists of a processing circuit 3 and display unit 4, be combined with the playback device 1 to form a componental unit 6 corresponding to FIGS. 5 and 6.

We claim:

1. Optical apparatus for signaling a cause of error in a reproducing apparatus for recovering information recorded on an optical recording medium having a plurality of tracks and subject to defects, said apparatus comprising:

pickup circuitry conditioned to produce an RF signal from said optical recording medium, said RF signal, in the absence of defects, exhibiting output values which swing between a relatively positive average maximum value A and a relatively negative average minimum value B;

a threshold value circuit coupled to receive said RF signal to generating a dynamic threshold value which is a predetermined amount less than said relatively positive average maximum value A;

comparator circuitry arranged, to determine occurrences of an envelope of said RF signal falling below said threshold value when said RF signal is concurrently greater than a second predetermined value:

a duration detector including an integrator, coupled to said comparator circuitry, said duration detector producing a control signal when the duration of one of said occurrences exceeds a predetermined duration, indicating an occurrence of an error of a particular cause; and display means coupled to said duration detector and displaying fingerprint as the cause of error responsive to said control signal.

2. Optical apparatus for signaling a cause of error in a reproducing apparatus for recovering information recorded on an optical recording medium having a plurality of tracks and subject to defects said apparatus comprising:

means for producing an RF signal from said optical recording medium, said RF signal having an envelope with values which lie between a relatively positive value A and a relatively negative value B;

first and second oppositely poled rectifiers, having respective input terminals coupled to receive said RF signal, and having respective output terminals;

potential dividing circuitry coupled between the output terminals of the first and second oppositely poled rectifiers for generating first and second rectified signals having values which lie between values of rectified signals available from the output terminals of the first and second oppositely poled rectifiers;

first and second comparators, respectively having inverting and non-inverting input terminals and output terminals, with the inverting input terminal of the first comparator coupled to receive the first rectified signal and the non-inverting input terminal of the second comparator coupled to receive the second rectified signal;

a third rectifier, having a shorter time constant than said first and second oppositely poled rectifiers, having an input terminal coupled to receive said RF signal and having an output terminal coupled to the inverting and non inverting input terminals of said second and first comparators respectively; and logic circuitry coupled to the output terminals of said first and second comparators;

detection means including an integrator to detect when ones of said occurrences exceed a predetermined duration which indicates an occurrence of an error of a particular cause; and display means coupled to said detection means for displaying fingerprint is the cause of error.

3. The apparatus set forth in claim 2 wherein said first and second oppositely poled rectifiers include selectable time constants to enable said apparatus to accommodate RF signals of different frequency.

4. The apparatus set forth in claim 2 wherein said first and second oppositely poled rectifiers respectively comprise;

a diode coupled between the input and output terminals of the respective rectifier;

a constant current source coupled to the output terminal of the rectifier; and a capacitor coupled between the output terminal of the respective rectifier and a point of constant potential.

5. Optical apparatus for signaling a cause of error in a reproducing apparatus for recovering information recorded on an optical recording medium having a plurality of tracks and subject to defects, said apparatus comprising:

means for producing an RF signal from said optical recording medium, said RF signal having an envelope with values which lie between a relatively positive value A and a relatively negative value B;

a threshold value circuit for generating a signal representing occurrences when the envelope of the RF signal is between an upper threshold value W1 and a lower threshold value W2, where value W1 is less that value A and value W2 is greater than value B;

a diode having a first terminal coupled to said threshold value circuit, and having a second terminal;

a capacitor coupled between the second terminal of said diode and a point of constant potential;

a constant current source coupled to the second terminal of said diode;

a comparator coupled to the second terminal of said diode;

a monostable multivibrator coupled to an output of said comparator; and display means coupled to said monostable multivibrator for displaying fingerprint as the cause of error.

6. Optical apparatus for signaling a cause of error in a reproducing apparatus for recovering recorded information from an optical recording medium having a plurality of tracks which traverse different sectors and which are subject to defects, and including apparatus for providing an RF signal representing recorded information recovered from said medium, said apparatus comprising:

error detection circuitry, responsive to decoded reproduced RF signal for detecting the occurrence of errors;

processing circuitry for evaluating the occurrence of errors in respective tracks, and determining that a fingerprint is a cause of error when a predetermined minimum number of errors occur in the sane sector of a predetermined minimum number of neighboring tracks; and display means, responsive to said processing circuitry, for displaying that a fingerprint is a cause of error.

7. The apparatus set forth in claim 6 wherein said errors occur in bursts and said predetermined minimum number of errors are 3 bursts of errors, and said predetermined minimum number of neighboring tracks is 5.

8. A method for signaling a cause of error in a reproducing apparatus subjected to detecting defects on an optical recording medium having a plurality of tracks which traverse different sectors, and including apparatus for providing an RF signal representing recorded information recovered from said medium, and wherein deviations of an envelope of said RF signal, from a substantially constant value, indicate the occurrence of errors, said method comprising:

producing, with a first time constant, a first signal representing an envelope of said RF signal;

producing from said RF signal, with a second time constant longer than said first time constant, a second signal representing a dynamic threshold signal;

comparing said first and second signals for determining occurrences of said envelope of said RF signal falling within a predetermined range of values, said predetermined range of values having an upper value less than said substantially constant value, and a lower value greater than the minimum value the envelope may exhibit;

measuring the duration of respective said occurrences; and signaling that a fingerprint is a cause of error whenever a measured duration is greater than a predetermined period.

9. A method for signaling a cause of error in a reproducing apparatus subjected to detecting effects on an optical recording medium having a plurality of tracks which traverse different sectors, and including apparatus for providing an RF signal representing recorded information recovered from said medium, and wherein deviations of an envelope of said RF signal, from a substantially constant value, indicate the occurrence of errors, said method comprising;

determining occurrences of said envelope of said RF signal falling within a range between 7 percent and 93 percent of the normal range of values exhibited by the envelope of the RF signal;

measuring the duration of respective said occurrences; and signaling that a fingerprint is a cause of error whenever a measured duration is greater than 4 ms.

10. A method for signaling a cause of error in an optical reproducing apparatus of the type for recovering recorded information from an optical recording medium having a plurality of tracks which traverse different sectors and which are subject to defects, and including apparatus for providing an RF signal representing recorded information recovered from said medium, said method comprising:

detecting bursts of errors and error rates in said bursts in decoded reproduced RF signal;

evaluating bursts of errors in respective tracks for the occurrence of similar numbers of bursts of errors having like error rates, and determining when a predetermined minimum number of bursts of errors having like error rates occur in a same sector of a predetermined minimum number of neighboring tracks; and displaying fingerprint as a cause that is responsible for generating such predetermined minimum number of bursts of errors having like error rates occurring in the same sector of a predetermined minimum number of neighboring tracks.

11. The method set forth in claim 10 wherein said cause is a fingerprint when said predetermined minimum number of bursts errors is three and said predetermined minimum number of neighboring tracks is five.

12. The method set forth in claim 11 wherein said error burst corresponds to four defective frames in a group of 96 frames.

13. A method for signaling a cause of error in an optical reproducing apparatus of the type for recovering recorded information from an optical disc having a plurality of tracks which traverse different sectors and which are subject to defects, and including apparatus for providing an RF signal representing recorded information recovered from said medium, said method comprising:

detecting bursts of errors and error rates in said bursts in decoded reproduced RF signal;

evaluating bursts of errors in respective tracks for the occurrence of at least three bursts of errors having like error rates in a same sector of at least five neighboring tracks; and displaying that fingerprints are a cause of errors when at least three bursts of errors having like error rates are detected in a same sector of at least five neighboring tracks.

14. Optical apparatus for signaling a cause of error in a reproducing apparatus for recovering information recorded on an optical recording medium having a plurality of tracks and subject to defects, said apparatus comprising:

means for producing an RF signal from said optical recording medium, said RF signal having an envelope with values which lie between a relatively positive value A and a relatively negative value B;

a threshold value circuit for generating a signal representing occurrences when the envelope of the RF signal is between an upper threshold value W1 and a lower threshold value W2, where value W1 is less that value A and value W2 is greater than value B;

detection means including an integrator to detect when ones of said occurrences exceed a predetermined duration which indicates an occurrence of an error of a particular cause;

error detection circuitry, responsive to decoded reproduced RF signal for detecting the occurrence of coding errors;

processing circuitry for evaluating the occurrence of coding errors in respective tracks, and determining a particular cause of error when a predetermined minimum number of errors occur in the same sector of a predetermined minimum number of neighboring tracks; and display means, responsive to said processing circuitry and said detection circuitry, for displaying fingerprint as a cause of error when certain types of errors are detected.

15. Optical apparatus for signaling a cause of error in a signal reproducing apparatus for recovering recorded information from an optical recording medium having a plurality of recording tracks and subject to defects, said apparatus comprising:

a detector for recovering recorded signal from said recording medium;

a fingerprint detector including:

a first envelope detector having a first time constant, having an input terminal coupled to receive RF signal reproduced from said recording medium, and having an output terminal at which an envelope of said RF signal is available;

a second envelope detector having a second time constant which is long compared to said first time constant, having an input terminal coupled to receive said RF signal and an output terminal at which a dynamic threshold signal is available;

a comparator having first and second input terminals coupled to the output terminals of said first and second envelope detectors, and having an output terminal which exhibits first and second states when said envelope is greater and lesser than said dynamic threshold signal respectively;

a duration detector, coupled to said comparator and having an output terminal at which said control signal is available, said control signal exhibiting a first state when values, of said envelope are less than said dynamic threshold signal for a predetermined period, and a second state otherwise; and a display device, coupled to said fingerprint detector, and conditioned by said control signal to provide an indication of occurrences of fingerprints on said recording medium.

* * * * *